United States Patent [19]

Murphy et al.

[11] Patent Number: 5,996,976
[45] Date of Patent: *Dec. 7, 1999

[54] GAS HUMIDIFICATION SYSTEM USING WATER PERMEABLE MEMBRANES

[75] Inventors: Oliver J. Murphy; G. Duncan Hitchens, both of Bryan; Alan J. Cisar, Cypress; Anuncia Gonzalez-Martin, College Station, all of Tex.

[73] Assignee: Lynntech, Inc., College Staition, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,210

[22] Filed: Apr. 30, 1996

Related U.S. Application Data

[63] Continuation-in-part of application No. 08/344,285, Nov. 23, 1994, Pat. No. 5,512,831, and a continuation-in-part of application No. 08/344,813, Nov. 23, 1994, Pat. No. 5,635,039, which is a continuation-in-part of application No. 08/091,752, Jul. 13, 1993, Pat. No. 5,460,705.

[51] Int. Cl.[6] ............................................. B01F 3/04
[52] U.S. Cl. ........................................ 261/104; 261/107
[58] Field of Search .................................. 261/104, 107, 261/142, 154

[56] References Cited

U.S. PATENT DOCUMENTS

| | | | |
|---|---|---|---|
| 3,110,273 | 11/1963 | Beusman et al. | 261/104 X |
| 3,403,531 | 10/1968 | Oesterheld | 261/104 X |
| 4,068,625 | 1/1978 | Brown | 261/104 X |
| 4,086,305 | 4/1978 | Dobritz | 261/104 X |
| 4,098,852 | 7/1978 | Christen et al. | 261/104 |
| 4,155,961 | 5/1979 | Benthin | 261/104 |
| 4,225,542 | 9/1980 | Wall et al. | 261/142 |
| 4,355,636 | 10/1982 | Oetjen et al. | 261/104 X |
| 4,367,734 | 1/1983 | Benthin | 261/104 X |
| 4,381,267 | 4/1983 | Jackson | 261/104 |
| 4,705,543 | 11/1987 | Kertzman | 96/6 |
| 4,895,683 | 1/1990 | Iwasaki et al. | 261/104 X |
| 4,973,530 | 11/1990 | Vanderbogh et al. | 429/13 |
| 4,976,113 | 12/1990 | Gershuni et al. | 261/154 X |
| 5,139,344 | 8/1992 | Mutter | 73/73 X |
| 5,200,278 | 4/1993 | Watkins et al. | 429/24 |
| 5,348,691 | 9/1994 | McElroy et al. | 261/104 X |
| 5,368,786 | 11/1994 | Dinauer et al. | 261/130 |
| 5,382,478 | 1/1995 | Chow et al. | 429/26 |

FOREIGN PATENT DOCUMENTS

| 54-6168 | 1/1979 | Japan | 261/104 |
|---|---|---|---|

*Primary Examiner*—Richard L. Chiesa
*Attorney, Agent, or Firm*—Streets & Associates; Jeffrey L. Streets

[57] ABSTRACT

The present invention provides a gas humidifier for the humidification of reactant gases supplied to electrochemical devices such as electrolyzers and fuel cells. The humidifier provides a water permeable member, such as a polymer membrane in the form of a tube, sheet, tubulated sheet and the like, that can be saturated with water to allow evaporation of water into a gas stream passing over a water permeable member. The humidifier is compact and lightweight, yet provides efficient humidification of gases at flow rates as low as about 0.1 grams per minute of water.

10 Claims, 2 Drawing Sheets

GAS HUMIDIFICATION SYSTEM USING WATER PERMEABLE MEMBRANES

This application is a continuation-in-part of Ser. No. 08/344,285, now U.S. Pat. No. 5,512,831, filed Nov. 23, 1994 and Ser. No. 08/344,813, now U.S. Pat. No. 5,635,039, filed Nov. 23, 1994 which is a continuation-in-part of Ser. No. 08/091,752, now U.S. Pat. No. 5,460,705, filed Jul. 13, 1993. Note that the U.S. government may have rights in the subject matter disclosed and claimed herein

FIELD OF THE INVENTION

The present invention relates generally to a method and apparatus for humidifying gases. More particularly, the present invention relates to humidifiers utilizing water permeable membranes to provide efficient humidification of gases even at low flow rates. Even more particularly, the present invention relates to the use of water permeable membranes, such as proton or cation exchange membranes, to provide a precise and consistent amount of water as low as about 0.1 grams per minute to a gas stream.

BACKGROUND OF THE DISCLOSURE

The development and use of solid polymer electrolytes has increased the efficiency and reduced the size of electrochemical cells. U.S. Pat. No. 4,416,747 (Menth et al.) discloses an individual electrolysis cell bounded by bipolar plates and having a solid electrolyte made of a polymer of perfluorinated sulfonic acid (such as that available under the trademark NAFION from E.I. duPont Company, Wilmington, Del.) with a surface coating centrally located between current-collectors and adjoining open metallic structures. A plurality of these individual cells may be integrated together between end plates so that the cells are electrically connected in series, hydrodynamically connected in parallel, and combined to form a block. However, these membranes must be kept moist at all times, since it acts as a conductor only when it is wet.

U.S. Pat. No. 4,417,969 (Ezzell et al.) discloses ion exchange membranes having sulfonic acid groups. The membrane is a polymer having a substantially fluorinated backbone and recurring pendant sulfonic acid groups represented by the following general formula:

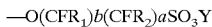
—O(CFR$_1$)$b$(CFR$_2$)$a$SO$_3$Y where a and b are independent integers from zero to three with the condition that the sum of a and b must be at least one; R1 and R2 are independently selected from the group consisting of a halogen and a substantially fluorinated alkyl group having one or more carbon atoms; and Y is hydrogen or an alkali metal.

NAFION is a sulfonic acid membrane having a substantially fluorinated backbone and pendant groups according to the following structure:

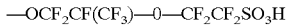
—OCF$_2$CF(CF$_3$)—O—CF$_2$CF$_2$SO$_3$H

Both NAFION 117 (all NAFION products are available from E.I. duPont Company, Wilmington, Del.) and NAFION 115 have equivalent weights of 1100 with thicknesses of 7 mils (175 μm) and 5 mils (125 μm), respectively.

The need for water to support proton conduction in membranes has been addressed in a number of ways. In fuel cells it would initially appear that since water is the product, sufficient water would be already present. Unfortunately, the water formed in a fuel cell is inadequate to maintain membrane hydration except under special conditions. Each proton that moves through the membrane drags at least two or three water molecules with it. As the current density increases the number of water molecules moved through the membrane also increases. Eventually the flux of water being pulled through the membrane by the proton flux exceeds the rate at which water is replenished by diffusion. At this point the membrane begins to dry out, and its internal resistance increases. This sets a relatively low limit on the current density that can be maintained by back diffusion from the cathode surface.

This problem has typically been addressed by adding water, as vapor, to the hydrogen containing stream, or to both gas streams (fuel and oxidizer). There is no doubt that this method works, and high power densities can be achieved. Unfortunately, humidifiers presently available are quite large, heavy and complex.

The simplest way to humidify a gas stream is to pass the gas as a stream of fine bubbles through water. As long as the gas has sufficient contact time with the water, controlling the temperature of the water controls the amount of water in the gas stream. This method works quite well at low gas flow rates, but problems begin to arise as the required gas flow rate increases. To fully saturate a gas with water requires either small bubbles, ideally under 0.5 mm in diameter, or a tall column to allow enough contact time to insure complete saturation. Operating a humidifier under conditions where a gas does not have sufficient contact time to become fully saturated results in the gas carrying a varying amount of water. This unstable operation is undesirable and unacceptable in certain applications, such as the humidification of reactant gases fed to electrochemical devices.

When bubble column type humidifiers are used to saturate a gas stream, they can become rather large. For example, if a contact time of 0.5 seconds is required to saturate the bubbles with water, the column will need to be at least 19 cm tall (based on Stokes law velocity of 38.2 cm/sec for a 0.5 mm bubble of air in water at 80° C.). For a flow rate of one liter of gas per minute, as 0.5 mm bubbles with an average spacing of 0.5 mm, a water volume of over 300 cm$^3$ is required, with a similar or greater volume for the reverse portion of the convective flow produced by the gas lifting the water. Additional volume is required for the disperser to form the bubbles and for a reserve of water to replenish that lost to evaporation. The resulting humidifier has a volume of over one liter, and any increase in gas flow rate will require an even larger volume.

U.S. Pat. No. 4,973,530 issued to Vanderborgh et al. entitled FUEL CELL WATER TRANSPORT discloses that the moisture content and temperature of a gas can be regulated throughout traverse of the gas in a fuel cell incorporating a solid polymer membrane. Each cell has a flow field incorporating a membrane for effective water transport to a gas as it passes to a second flow field where chemical reactions occur. In this mainer, the temperature and humidity of a gas is effected at each cell. Humidification is achieved by passing the fuel cell gas over the face of a membrane section that is in contact with liquid water on the opposite face.

Another method has been used to humidify a gas inside a proton exchange membrane fuel cell stack assembly, or stack itself. This is accomplished utilizing an internal "dummy cell" dedicated solely to gas humidification. U.S. Pat. No. 5,200,278 issued to Watkins et al. entitled INTEGRATED FUEL CELL POWER GENERATION SYSTEM discloses a fuel cell stack having a humidification section and an electrochemically active section, wherein the humidification section imparts water vapor to an inlet hydrogen containing fuel stream and an inlet oxygen containing oxidant stream. This is done with a membrane humidifier, in which a stream of water is located on one side of a planar membrane sheet of a water permeable material and the gas stream flows on the other side. This method uses the heat of the cell itself to evaporate the water. This method is advantageous because it eliminates the need for an external source of heat to humidify the gas streams. However, the method is also disadvantageous, first, because it limits the humidification of the gas streams to a dew point that is essentially the same as the fuel cell operating temperature and, second, because it also adds to the size of the fuel cell stack. Since the humidifier is a structural part of the stack, it has to be built to serve as a supporting member. This can increase the weight and size of the system by a greater amount than is required for an external humidification system. Extra weight is always a disadvantage.

U.S. Pat. No. 5,382,478 issued to Chow et al. entitled ELECTROCHEMICAL FUEL CELL STACK WITH HUMIDIFICATION SECTION LOCATED UPSTREAM FROM THE ELECTROCHEMICALLY ACTIVE SECTION similarly discloses a fuel cell with a "dummy cell" type humidification section, but teaches that the inlet fuel and oxidant streams should be introduced into the humidification section without first being directed through the electrochemically active section. In this manner, Chow reduced the number of manifold openings in the active section and increases the area available for electrochemical reactions. However, this humidifier suffers the same disadvantages as the '278 patent described above.

Still another humidification method is to inject water directly into either the manifold of a cell or stack, or a gas line leading into the manifold. The water is injected in such a manner as to form a mist in the gas line. As the gas stream is heated by the fuel cell, the water, which has a high surface area due to its small droplet size, quickly evaporates. This type of humidifier produces a very compact humidification system. The amount of water in the gas stream can easily be controlled by metering the liquid water feed into the fuel cell. While this is a good system for fuel cell stacks in the kilowatt range and larger, it is not an effective or efficient system for smaller systems. The disadvantage of direct injection is the difficulty encountered in forming a steady consistent mist at low water flow rates. For instance, a nominally 1 kW proton exchange membrane fuel cell stack consisting of six cells, each at 0.6 V, operating at 85° C. with both the fuel and air streams humidified, requires about 10.3 grams of water per minute to humidify its air stream, assuming a 2:1 air to current stoichiometry at 30 psig. This amount is easily meterable on a consistent basis. A smaller stack, generating 300 W at 70° C. requires only 1.50 grams of water per minute under the same feed conditions. This amount can be metered, but the higher precision required to maintain a smooth flow at the lower feed rate results in the smaller stack actually requiring a more complex humidifier. In the case of an even smaller stack operating at 30W, and the same operating conditions as above, the feed rate drops to 0.150 grams of water per minute for the air stream, and even less for the fuel gas stream. At these feed rates, maintaining a steady flow is extremely difficult. Using a mist type humidifier under these conditions makes controlling the humidifier the most difficult part of operating the stack.

Thus, there remains a need for a humidifier that can deliver a precise and consistent amount of water at a flow rate as low as about 0.1 grams per minute to a gas stream. It would be desirable if the humidifier were small, lightweight and easy to control.

SUMMARY OF THE INVENTION

The present invention provides a humidifier comprising a water permeable membrane having a water contacting surface and a gas contacting surface; a water reservoir supplying water to the water contacting surface; and a gas passageway for flowing a gas stream in contact with the gas contacting surface, wherein water is drawn through the membrane from the water contacting surface to the gas contacting surface for evaporating into the gas stream.

Another aspect of the present invention provides a humidifier comprising a plurality of substantially parallel water permeable members positioned a spaced distance apart, each member having a gas passageway extending through the member for flowing a gas stream; and water channels formed in the space between members for supplying water to saturate the water permeable members, wherein water from the saturated members evaporates into the gas stream. The substantially parallel water permeable members may be sheets having two sides, a perimeter edge and a plurality of substantially parallel pathways extending within the sheet from points along the perimeter edge to opposing points along the perimeter edge. Furthermore, the substantially parallel water premeable members may be tubes.

Another aspect of the present invention provides a humidifier comprising: a plurality of substantially parallel water permeable members positioned a spaced distance apart, each member having a water channel extending through the member for supplying water to saturate the water permeable member; and gas passageways formed in the space between members, wherein water from the saturated water permeable members evaporates into the gas stream.

A further aspect of the present invention provides a method for humidifying a gas stream comprising the steps of: providing a water permeable member having a passage therethrough; supplying water to the exterior of the water permeable member; and passing a gas stream through the passage in the water permeable member to humidify the gas stream. This method may further comprise the step of heating the supply of water.

Yet another aspect of the present invention provides a method for humidifying a gas stream comprising the steps of: providing a water permeable member having a passage therethrough; supplying water to the exterior of the water permeable member; and passing a gas stream through the passage in the water permeable member to humidify the gas stream.

The present invention also provides an electrochemical system comprising an electrochemical device having a reactant gas inlet; and a gas humidifier for supplying humidified reactant gas to the reactant gas inlet, the gas humidifier comprising a water permeable membrane having a water contacting surface and a gas contacting surface; a water reservoir supplying water to the water contacting surface; and a gas passageway for flowing reactant gas over the gas contacting surface, wherein water is drawn through the membrane from the water contacting surface to the gas contacting surface for evaporating into the reactant gas.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a humidifier for humidifying gases. The humidifier of the present invention may be particularly useful for the humidification of reactant gases supplied to electrochemical devices such as electrolyzers and fuel cells. More particularly, the present invention provides a simple method and apparatus for the efficient humidification of gases at flow rates as low as about 0.1 grams per minute of water.

The general operation of the humidifiers of the present invention, involves the evaporation of water into a gas stream passing over a water permeable member that is saturated with water. The water permeable member may take on many forms, including tubes, sheets, tubulated sheets and the like. Water is delivered to a water contacting surface of the water permeable member for absorption into and saturation of the member. While any water permeable polymer materials may be used, such as polyurethanes, acrylates, sulfonated polystyrenes, sulfonated polytrifluorostyrene, the preferred materials include perfluoronated sulfonic acid polymers.

As previously described, the stable performance of fuel cells requires that the humidity of the reactant gases be precisely controlled. The humidifier of the present invention provides a large, but known, surface area of water for exposure to the gas stream. Unlike the bubble column, the residence time that the gas contacts the water can be controlled by the amount of surface area and the gas flow rate, rather than the height of a water column. This allows the size of the humidifier to be reduced. Furthermore, the humidifier weighs less because less water is needed.

Figure 2:
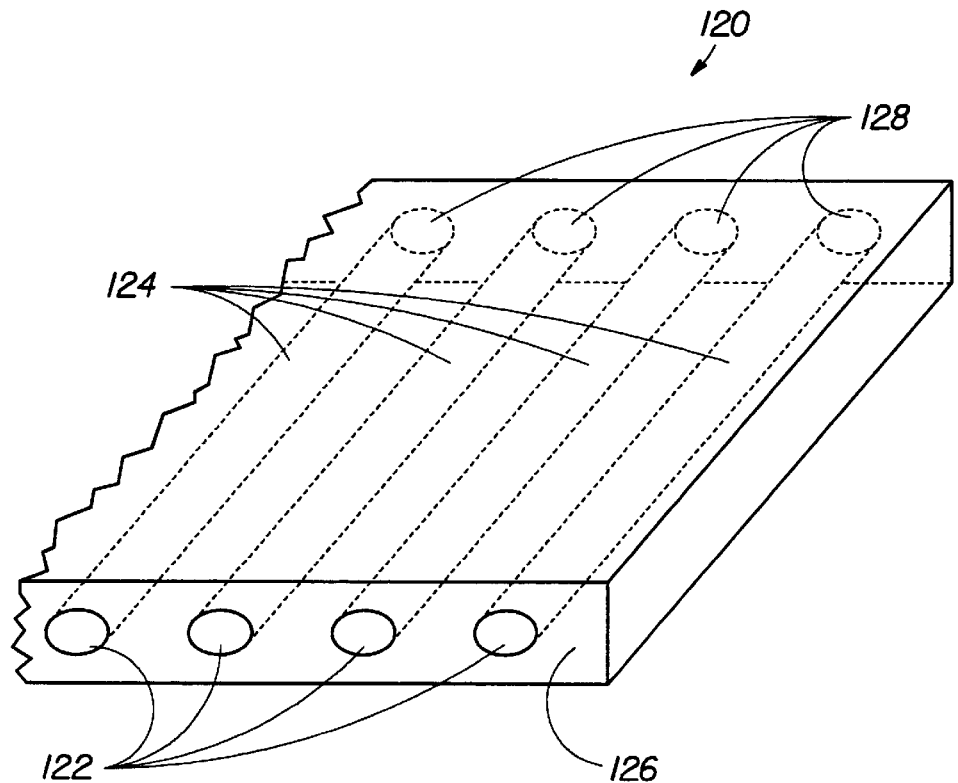
FIG. 2 is a perspective view of a portion of a membrane with internal passages.

In one aspect of the invention, the water permeable member is a tubulated membrane, such as that shown in FIG. 2, which allows water passage between the two surfaces of the membrane. In this configuration, gas may be humidified over both surfaces of the membrane, thereby providing twice the amount of humidification of a typical "dummy cell" membrane having water on one side and gas on the other.

In another aspect of the invention, a humidifier utilizes a plurality of substantially parallel water permeable tubes inside a water jacket. A gas passing through the tube side is humidified by water passing over the shell side and permeating through the tube. This design provides a very high surface area for humidification for a given amount of space and weight of equipment. Furtherrnore, the humidification rate can be controlled even at low flow rates since water will only evaporate and enter the gas phase up to the saturation point. The temperature of the humidifier may be elevated with a heater element wrapped around the water jacket in order to increase the amount of water transferred into the gas.

EXAMPLE 1

Figure 1:
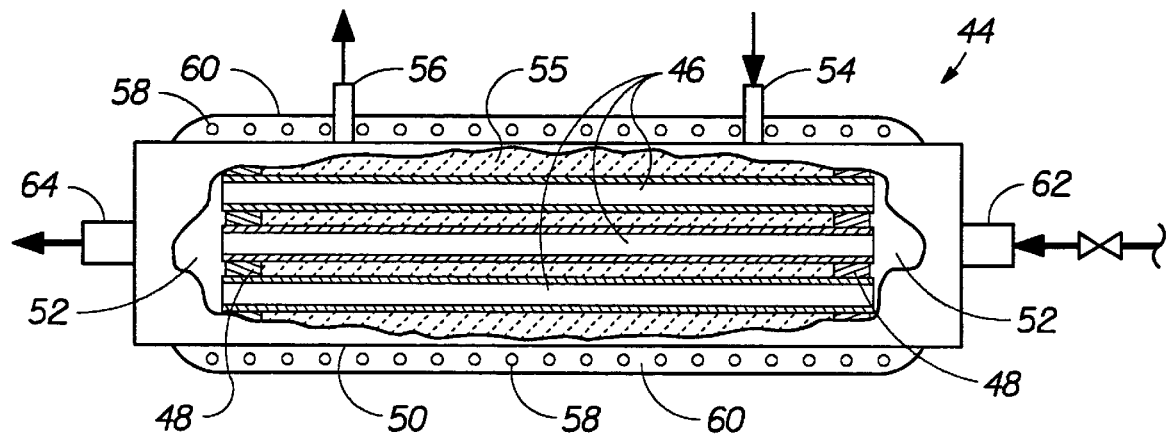
FIG. 1 depicts a partial section view of a gas humidifier that finds application in the present invention.

Now referring to FIG. 1, a humidifier 44 is shown comprising ten parallel, nine (9) inch NafionTM tubes 46 mounted in common polypropylene end plugs 48 inside a stainless steel jacket 50 with attachment points on the ends to feed gas into the NAFION tubes using that portion of the stainless steel jacket beyond the polypropylene plugs as a gas manifold 52. The water jacket 55 is positioned inside the stainless steel jacket 50 and surrounds the tubes 46. Connection 54 in the wall of the stainless steel jacket 50 feeds water into the water jacket 55. Connection 56 in the wall of the stainless steel jacket 50 removes water from the water jacket 55. Elements of the humidifier including the NAFION tubes were obtained from Perma Pure Products, Inc., Tom's River, N.J. The tubes 46 had an internal diameter of 0.060 inch and a wall thickness of 0.0035 inch.

While the tubes are substantially parallel, they are flexible and largely unsupported between the ends. It is preferred that the tube be installed between the end caps so that tubes are not in tension, even when dry. The tube expand and lengthen upon wetting and the tube surfaces will come into contact with each other without any detrimental effect.

A heating element 58 with a resistance of 90 ohms was wrapped around the outer jacket 50 and covered with fiberglass insulation 60. Allowing for a few additional ohms of resistance in the contacts and leads, this heater will supply about 140 Watts of heat to the assembly. The unit 44 was then mounted on a standard laboratory stand with the NafionTM tubes 46 oriented vertically. A lower gas fitting 62 was attached to a feed line from a nitrogen cylinder. An upper gas fitting 64 was vented to the room. The lower water fitting 54 was plugged and the upper fitting 56 connected to a tube leading to a standard laboratory burette. The burette was used as a water reservoir with the calibration lines on the burette allowing the easy measurement of the amount of water vaporized by the humidifier.

Gas was fed from the lower gas fitting 62 into the gas manifold 52 at constant pressure and the flow controlled with a needle valve. The flow rate was measured by displacement at the start and end of each measurement. Temperature was controlled by a solid state temperature controller, using a Type J thermocouple attached to the outside of the heater and under the insulation.

The following procedure was used for each measurement:

I.) start gas flow;

ii.) set temperature controller to the desired value;

iii.) allow the system to come to thermal equilibrium;

iv.) measure gas flow and record water level;

v.) allow unit to operate for 60–90 minutes occasionally recording the water level; and vi.) record final water level and measure gas flow.

The data collected was used to calculate the dew point achieved in the exit gas stream based on the amount of water evaporated into the amount of gas passing through the humidifier. The results are recorded in Table I.

TABLE I

| RUN | TEMPERATURE | FLOW (l/m) | DEW POINT |
|---|---|---|---|
| 1 | 60° C. | 1.80 | 58° C. |
| 2 | 60° C. | 3.95 | 48° C. |
| 3 | 80° C. | 3.72 | 61° C. |

TABLE I-continued

| RUN | TEMPERATURE | FLOW (l/m) | DEW POINT |
|---|---|---|---|
| 4 | 80° C. | 2.55 | 64° C. |
| 5 | 90° C. | 2.09 | 72° C. |

Condensation was observed forming on the exterior of the humidifier near the bottom in the region between the gas inlet and the start of the heater. While the actual temperature of the water inside the humidifier was not measured, the presence of condensation indicates that the temperature of the water inside the humidifier was much less than the temperature outside the heater. This conclusion is supported by the fact that the amount of heat lost from the system by evaporation was as high as 22 Watts compared with the 35 Watts of heat put out by a 140 Watt heater with a duty cycle of about 25%. These results show that this method can easily humidify the amount of gas used by most small fuel cells.

EXAMPLE 2

The humidifier from EXAMPLE 1, described above, was installed in a system incorporating a low capability microprocessor, such as an Intel 8088. And a plurality of gas supplies, each of which is first directed to a feed gas pressure regulator with an associated dial gauge. Oxygen, air, and hydrogen are then directed to a gas shut-off solenoid, an additional safety feature for automatic shutdown. Control for the solenoids is provided by a mechanical relay panel for 24 V DC power.

The oxygen/air line then proceeds to a humidifier and the hydrogen/nitrogen line proceeds to a humidifier. The heaters of the humidifiers and are powered from a solid state relay panel 86 for 120 V.

As previously described, the processor controlling the system also operates the heater on the outside of the humidifier shell to maintain the internal water temperature at the desired value. The same computer controls the mass flow controllers to regulate the gas fed to the humidifiers. To test the humidifier's proper function, the water feed line to the humidifier was connected to a burette. The amount of water consumed by evaporation was determined by reading the burette.

For this experiment the computer was utilized to maintain a set and stable temperature and gas flow rate. The water consumption was monitored as a function of time for a period of one to six hours and the effective dew point of the gas stream calculated from the amount of water which had evaporated. The results are shown in Table II.

TABLE II

| RUN | TEMPERATURE | RELATIVE HUMIDITY | DEW POINT |
|---|---|---|---|
| 1 | 35° C. | 95.9% | 34.3° C. |
| 2 | 50° C. | 100.1% | 50° C. |
| 3 | 55° C. | 102.4% | 55.5° C. |

In all three cases the amount of water consumed corresponded to the amount expected for a saturated gas stream at a temperature within 1° C. of the control point. Since the accuracy of the thermisters used to monitor the temperature is only ±1° C., this is within experimental error of ideal.

In another aspect of the present invention, a humidifier includes the use of passages of approximately 2 to 9 mils diameter within a sheet of proton exchange membrane, as shown in FIG. 2. In this manner, water can be provided to the open ends 122 of the passages 124 along one edge 126 of the membrane 120 and delivered throughout the membrane 120 by capillary action. The water may even be circulated through the passages 124 and exit the membrane 120 at the open ends 128.

A proton exchange membrane ("PEM") with internal passages can be formed in a variety of ways. Briefly, the technique involves pressing ionically conducting material around a plurality of removable elements at sufficient temperature and pressure to fuse the material into a single membrane. After the material is fused, the elements are removed from the membrane to leave a passage for fluid. The removable elements may take any shape or form so long as the passages provide a substantially uniform flow of fluid throughout the entire membrane. The preferred removable elements are substantially parallel wires or tubes. However, it may be possible to form the passages around elements which are later removed through dissolution.

One method of providing a membrane with substantially uniform passages requires slipping a plurality of hollow tubes over a plurality of substantially parallel, removable elements and hot pressing. The preferred elements include niobium wire and polytetrafluoroethylene ("PTFE") tubing having a diameter of between about 0.015 and about 0.025 inches and which is no more than 2 mils smaller than the internal diameter of the hollow tubes. Perfluorosulfonic acid hollow tubes suitable for use in the present invention are available from Perma-Pure, Inc., Tom's River, N.J.

Figure 3:
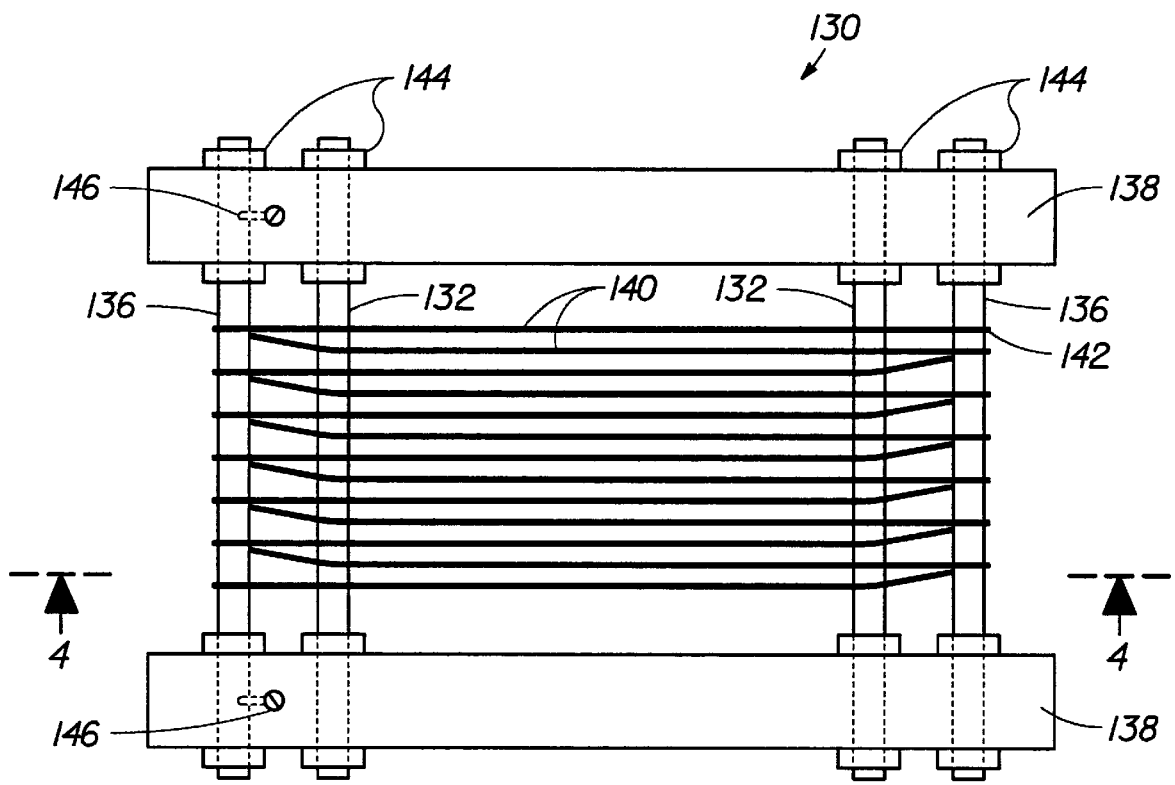
FIG. 3 is a schematic top view of a tensioning frame for forming a membrane with internal passages.
Figure 4:
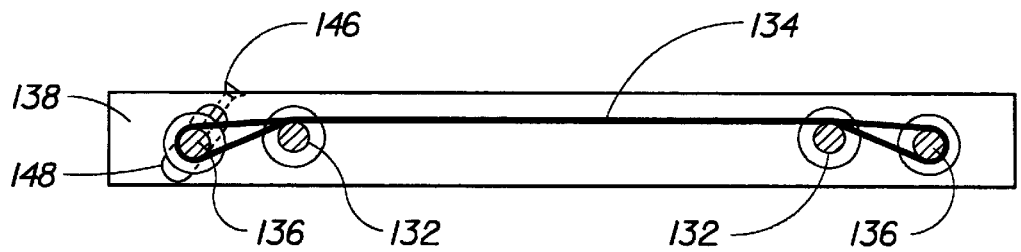
FIG. 4 is a schematic side view of the tensioning frame of FIG. 3.

Referring now to FIG. 3, a tensioning frame 130 is shown that was designed for holding a series of tubes and/or removable elements tight and parallel during formation of a membrane with internal passages. This tensioning frame 130 has a pair of upper tensioning rods 132 having top surfaces lying in a common plane (shown best in FIG. 4 at line 134). The upper tensioning rods 132 are a sufficient distance apart to form a membrane therebetween, typically from about 3 to about 5 inches. A pair of lower tensioning rods 136 are separated by the upper tensioning rods 132 having top surfaces lying in or below the common plane of the upper tensioning rods 132. These two sets of tensioning rods are firmly held in position by two substantially parallel sidebars 138.

One end of a long string of tubing and/or removable wire or tubing 140 is tied to a lower tensioning rod 136, say at point 142. The string is then passed over the top of both upper tensioning rods 132 and around the other lower tensioning rod 136. The string is threaded back and forth in this fashion, positioning the hollow tubes in side-by-side contact, until the tubes cover a planar area the size of the desired membrane, typically between a 3 inch by 3 inch square and a 5 inch by 5 inch square. However, the membrane may be formed or cut into any shape. Once the membrane has been formed, the membrane can be removed from the frame either by cutting the tubing and/or wires along both ends near the upper or lower tensioning rods, 132 or 136 respectively, or by disconnecting the rods 132 and 136 from one sidebar 138 by removing bolts 144.

The apparatus may also include means for adjusting the tension on a tubular membrane that is threaded over the tensioning frame. The tension is adjusted by moving (1) an upper tensioning rod upward or outward, and/or (2) a lower tensioning rod downward or outward. Typically, the rods are moved and the tubes or elements tightened by turning a set screw 146 in the sidebar 138 which puts a perpendicular force on the rod. It is preferred that the tensioning frame have only one adjustable rod and that the sidebars have a narrow slot 148 through which the rod can travel as the screw 146 is tightened.

A somewhat thicker membrane can be formed by placing a thin sheet of the PEM material above and/or below the hollow tubes before pressing. Alternatively, the material to be pressed may be two thin sheets placed on opposing sides of the removable elements without the use of tubes.

The membrane is pressed by first placing an aluminum block small enough to fit in the space inside the frame on the lower platen of the press and topping it with a silicone rubber load leveling pad and a release sheet, usually PTFE finished cloth. When one membrane is used, that membrane is placed on the release sheet. Next, the filled tensioning frame is placed with the tubes directly over the release sheet. If two membranes are being used, the second membrane is placed on top of the filled frame. In either case, this arrangement is topped with a second release sheet, a second leveling pad, and a second aluminum block. The press is then closed and the press cycle carried out.

Pressing of a PFSA membrane with internal passages is carried out at a pressure between about 380 psi and about 420 psi and temperature between about 150° C. and about 210° C. over a period of about one minute. The preferred conditions for pressing a PFSA membrane with PFSA tubes in the proton form is about 165° C. and about 400 psi. The preferred conditions for pressing two sheets of PFSA around PTFE elements without PFSA tubes are 200° C. and 400 psi. In either case, the removable elements are easily withdrawn after placing the membrane in deionized water.

A PEM membrane with internal passages can also be made with the thermoplastic sulfonyl fluoride precursor to PFSA. The pressing techniques are the same as with PFSA, except that the preferred pressing conditions include a pressure of about 400 psi and temperature of about 175° C. for a period of about 5 minutes. After pressing, the membrane is hydrolyzed with a 25% sodium hydroxide solution at 85° C. to release the membrane from the wires. The ionomer is then treated with an acid, such as sulfuric acid, to convert it to the proton form for use.

An alternative method for forming a membrane with internal passages involves the application of a recast film of ionically conducting material onto solid tubes and/or sheets of the same material. For example, a 5% solution of perfluorosulfonic acid (such as NAFION available from Solution Technology, Mendenhall, Pennsylvania) can be sprayed onto PFSA tubes and/or sheets using an air brush. The PFSA tubing or sheets should be preswollen with an ethanol water mixture, to match the shrinkage of the recast film to be deposited on it. Then the tubing is wound on a tensioning frame with each tube in side-by-side contact and a release surface placed immediately behind the tubes. It is preferred that five coats of the 5% PFSA solution be applied with 10 to 15 minutes drying time between coats. After the application of the last coat, the tubulated membrane is allowed to dry for several hours at room temperature. The dry membrane is then baked under nitrogen at 100° C. for about one hour to cure the recast material so that it does not return to solution when exposed to water.

Ionically conducting material suitable for use in proton exchange membranes of the present invention include fluoronated ion exchange membranes. Suitable fluoronated materials for use in such membranes include perfluoronated sulfonic acids, perfluoronated carboxylic acids, polymeric systems based on perfluoro bis-sulfonimides, polymeric systems based on perfluoro phosphonic acids, perfluoronated tetraalkylammonium salts, carbanion acids thereof, and mixtures thereof. It is preferred that the fluoronated ion exchange membrane have an equivalent weight in the range between 500 grams and 1200 grams.

When the ionically conducting material is a perfluoronated sulfonic acid, it can be advantageous to convert the perfluoronated sulfonic acid from the proton form to a psuedothermoplastic form prior to pressing, then to return the perfluoronated sulfonic acid to the proton form after removing the tubulating elements. Perfluoronated sulfonic acid containing material is converted to the psuedothermoplastic form by contacting the material with a tetraalkyl ammonium ion containing solution such as tetrabutyl ammonium hydroxide. The benefit of pressing the membrane in the psuedothermoplastic form is that the elements can be more easily removed. The preferred conditions for pressing a PFSA membrane in the psuedothermoplastic form are a temperature of about 170° C. and a pressing pressure of about 400 psi.

The pressing of membranes with internal passages capable of conducting fluids may also be accompanied by hot pressing a rigid membrane support member, such as a metal frame. In such an instance, the press package is assembled in a manner analogous to that described for the pressing of membranes, except that a metal frame is positioned on either side of the membrane materials. The press conditions are determined by the configuration of membrane materials, as set out above. For example, when hot pressing a membrane and support assembly having two PFSA sheets around PTFE tubes, the preferred press conditions are to employ a pressure of about 400 psi at a temperature of about 200° C. for about one minute.

One further component which can be added to the press package for hot pressing is a PTFE gasket positioned around the perimeter of the membrane assembly. This complex assembly is then ready for installation in an gas humidifier configured in a filter press type arrangement.

It will be understood that certain combinations and subcombinations of the invention are of utility and may be employed without reference to other features or subcombinations. This is contemplated by and is within the scope of the present invention. Many possible embodiments may be made of this invention without departing from the spirit and scope thereof. It is to be understood that all matters herein above set forth or shown in the accompanying drawings are to be interpreted as illustrative and not in any limiting sense.

What is claimed is:

1. A humidifier comprising:

(a) a water permeable polymer sheet having two sides, a perimeter edge and a plurality of substantially parallel gas passages extending within the sheet from points along the perimeter edge to opposing points along the perimeter edge, said sheet and passages being an integral piece of material with the passages being voids within the sheet itself; and (b) a water chamber formed in communication with at least a portion of the water permeable polymer sheet.

2. The humidifier of claim 1, wherein the gas passages are substantially unobstructed.

3. The humidifier of claim 1, wherein the water permeable polymer sheet is a plurality of sheets positioned in a spaced apart relationship, and wherein the water chamber is formed between the sheets.

4. The humidifier of claim 1, wherein the water permeable polymer is a perfluorinated sulfonic acid polymer.

5. A humidifier comprising:

(a) a water permeable polymer sheet having two sides, a perimeter edge and a plurality of substantially parallel integral water passages extending within the sheet from points along the perimeter edge, said sheet and passages being an integral piece of material with the passages being voids within the sheet itself: and (b) a gas passageway in communication with at least a portion of the water permeable polymer sheet.

6. The humidifier of claim 5, wherein the parallel passages extend through the sheet.

7. The humidifier of claim 5, wherein the water permeable polymer sheet is a plurality of sheets positioned a spaced distance apart, and wherein the gas passageways formed between the sheets.

8. The humidifier of claim 5, wherein the integral water passages extend from points along the perimeter edge to opposing points along the perimeter edge.

9. The humidifier of claim 5, wherein the passages are substantially unobstructed.

10. The humidifier of claim 5, wherein the water permeable polymer is a perfluorinated sulfonic acid polymer.

* * * * *

UNITED STATES PATENT AND TRADEMARK OFFICE
CERTIFICATE OF CORRECTION

PATENT NO. : 5,996,976
DATED : December 7, 1999
INVENTOR(S) : Oliver J. Murphy et al.

It is certified that error appears in the above-identified patent and that said Letters Patent is hereby corrected as shown below:

Column 1,
Line 9, cancel "Note that the U.S. government may have rights in the subject matter disclosed and claimed herein." and insert the following -- This invention was made with government support under contract number NAS3-27213 awarded by the National Aeronautics and Space Administration (NASA). The government has certain rights in this invention. --.

Signed and Sealed this

Twenty-seventh Day of December, 2005

JON W. DUDAS
*Director of the United States Patent and Trademark Office*